United States Patent
Kurata et al.

(10) Patent No.: US 11,182,665 B2
(45) Date of Patent: Nov. 23, 2021

(54) RECURRENT NEURAL NETWORK PROCESSING POOLING OPERATION

(71) Applicant: INTERNATIONAL BUSINESS MACHINES CORPORATION, Armonk, NY (US)

(72) Inventors: Gakuto Kurata, Tokyo (JP); Masayuki Suzuki, Tokyo (JP)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 683 days.

(21) Appl. No.: 15/271,324

(22) Filed: Sep. 21, 2016

(65) Prior Publication Data
US 2018/0082167 A1   Mar. 22, 2018

(51) Int. Cl.
*G06N 3/04* (2006.01)
*G06N 3/08* (2006.01)

(52) U.S. Cl.
CPC ........... *G06N 3/0445* (2013.01); *G06N 3/084* (2013.01)

(58) Field of Classification Search
CPC ...... G06N 3/0445; G06N 3/084; G06N 20/00; G05B 2219/33025; G10L 15/16
See application file for complete search history.

(56) References Cited

U.S. PATENT DOCUMENTS

| | | | |
|---|---|---|---|
| 8,825,565 B2 * | 9/2014 | Marianetti, II | G06N 20/00 706/12 |
| 9,015,093 B1 * | 4/2015 | Commons | G01C 21/3602 706/26 |
| 9,378,733 B1 * | 6/2016 | Vanhoucke | G10L 15/02 |
| 9,807,473 B2 * | 10/2017 | Mei | H04N 21/8405 |
| 10,121,467 B1 * | 11/2018 | Gandhe | G10L 15/197 |
| 10,176,802 B1 * | 1/2019 | Ladhak | G10L 15/16 |
| 10,199,037 B1 * | 2/2019 | Filimonov | G10L 15/08 |
| 2014/0236577 A1 | 8/2014 | Malon et al. | |
| 2014/0236578 A1 | 8/2014 | Malon et al. | |
| 2015/0066496 A1 | 3/2015 | Deoras et al. | |
| 2017/0011738 A1 * | 1/2017 | Senior | G10L 15/063 |
| 2017/0083798 A1 * | 3/2017 | Yu | G06K 9/00751 |

(Continued)

FOREIGN PATENT DOCUMENTS

CN   104391963 A   3/2015

OTHER PUBLICATIONS

Dongxu Zhang, Dong Wang, Relation Classification via Recurrent Neural Network, 2015, Cornell University, version 2, all pages (Year: 2015).*

(Continued)

*Primary Examiner* — Alexey Shmatov
*Assistant Examiner* — Clint Mullinax
(74) *Attorney, Agent, or Firm* — Tutunjian & Bitetto, P.C.; Randall Bluestone (57) ABSTRACT

A method and system are provided. The method includes obtaining, by a hardware processor, candidate data representing a plurality of candidates. The method further includes calculating, by the hardware processor, for each of the candidates, a temporal next state of a Recurrent Neural Network (RNN) by inputting a corresponding one of the candidates to the RNN at a current state. The method also includes merging, by the hardware processor, the temporal next state for each of the candidates to obtain the temporal next state of the RNN.

20 Claims, 8 Drawing Sheets

(56) References Cited

U.S. PATENT DOCUMENTS

| | | | |
|---|---|---|---|
| 2017/0103305 A1* | 4/2017 | Henry | G06N 3/063 |
| 2017/0127016 A1* | 5/2017 | Yu | G06K 9/00711 |
| 2017/0249445 A1* | 8/2017 | Devries | G16H 10/60 |

OTHER PUBLICATIONS

Ladhak et al. "LatticeRnn: Recurrent neural networks over lattices", 2016, Interspeech 2016, pp. 695-699. (Year: 2016).*

Xue et al, "Improved Confusion Network Algorithm and Shortest Path Search from Word Lattice", 2005, IEEE International Conference on Acoustics, Speech, and Signal Processing, vol. 1, pp. 853-856. (Year: 2005).*

Laurent et al., "Computer-assisted transcription of speech based on confusion network reordering", 2011, IEEE International Conference on Acoustics, Speech and Signal Processing, pp. 4884-4887. (Year: 2011).*

Jalalvand et al, "Direct Word Graph Rescoring Using A* Search and RNNLM", 2014, Interspeech, 15th Annual Conference of the International Speech Communication Association, pp. 2630-2634. (Year: 2014).*

Cheng et al, "Open-Domain Name Error Detection using a Multi-Task RNN", 2015, Proceedings of the 2015 Conference on Empirical Methods in Natural Language Processing, pp. 737-746. (Year: 2015).*

Sundermeyer et al, "From Feedforward to Recurrent LSTM Neural Networks for Language Modeling", 2015, IEEE/ACM Transactions on Audio, Speech, and Language Processing, vol. 23, No. 3, pp. 517-529. (Year: 2015).*

Graves, A. et al., "Speech Recognition With Deep Recurrent Neural Networks" IEEE International Conference on Acoustics, Speech and Signal Processing (May 2013) pp. 1-5.

Graves, A. et al., "Towards End-To-End Speech Recognition With Recurrent Neural Networks" Proceedings of the 31st International Conference on Machine Learning (ICML-14) (Jun. 2014) pp. 1764-1772.

Yao, L. et al., "Describing Videos by Exploiting Temporal Structures" 2015 IEEE International Conference on Computer Vision (ICCV) (Feb. 2015) pp. 4507-4515.

Cho, K. et al., "Learning Phrase Representations using RNN Encoder-Decoder for Statistical Machine Translation" Proceedings of the 2014 Conference on Empirical Methods in Natural Language Processing (EMNLP) (Oct. 2014) pp. 1724-1734.

Greff, K. et al., "LSTM: A Search Space Odyssey" IEEE Transactions on Neural Networks and Learning Systems (Mar. 2015) pp. 1-18.

Gers, F.A. et al., "Learning to Forget: Continual Prediction with LSTM" Neural Computation (Oct. 2000) pp. 2451-2471, vol. 12, No. 10.

Jozefowicz, R. et al., "Exploring the Limits of Language Modeling" arXiv preprint arXiv:1602.02410 (Feb. 2016) pp. 1-11.

Koutnik, J. et al.m "A Clockwork RNN" arXiv preprint arXiv:1402.3511 (Feb. 2014) pp. 1-9.

\* cited by examiner

RECURRENT NEURAL NETWORK PROCESSING POOLING OPERATION

BACKGROUND

Technical Field

The present invention generally relates to information processing and, more particularly to a Recurrent Neural Network (RNN) processing pooling operation.

Description of the Related Art

RNN is used for text processing. For example, a text output from a speech recognition system can be input to the RNN. Although the speech recognition system can output not only a 1-best result but candidates of results of the system, the RNN processes a single input, usually the 1-best result from the speech recognition system.

SUMMARY

According to an embodiment of the present invention, a method is provided for processing a Recurrent Neural Network (RNN). The method includes obtaining, by a hardware processor, candidate data representing a plurality of candidate data. The method further includes calculating, by the hardware processor, for each of the candidate's data, a temporal next state of a Recurrent Neural Network (RNN) by inputting a corresponding one of the candidates to the RNN at a current state. The method also includes merging the temporal next state for each of the candidate's data to obtain the temporal next state of the RNN. According to another embodiment of the present invention, an apparatus and a computer program product are provided for implementing the above method.

These and other features and advantages will become apparent from the following detailed description of illustrative embodiments thereof, which is to be read in connection with the accompanying drawings.

DETAILED DESCRIPTION

Hereinafter, example embodiments of the present invention will be described. The example embodiments shall not limit the invention according to the claims, and the combinations of the features described in the embodiments are not necessarily essential to the invention.

Figure 1:
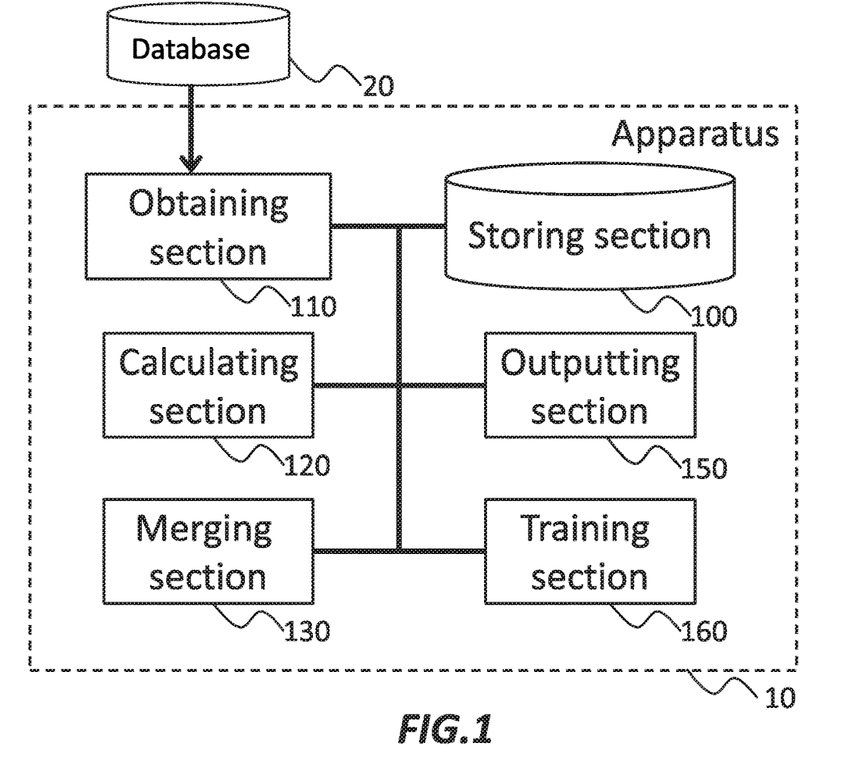
FIG. 1 shows an exemplary configuration of an apparatus 10, according to an embodiment of the present invention.

FIG. 1 shows an exemplary configuration of an apparatus 10, according to an embodiment of the present invention. The apparatus 10 can input a plurality of candidates of results instead of the best result in a RNN. The apparatus 10 can include a processor and one or more computer readable mediums collectively including instructions. The instructions, when executed by the processor, can cause the processor to operate as a plurality of operating sections. Thereby, the apparatus 10 can be regarded as including a storing section 100, an obtaining section 110, a calculating section 120, a merging section 130, an outputting section 150, and a training section 160.

The storing section 100 stores a variety of data used for operations of the apparatus 10. The storing section 100 can include volatile or non-volatile memory. One or more elements in the apparatus 10 (e.g., the obtaining section 110, the calculating section 120, the merging section 130, the training section 160, and the outputting section 150) can communicate data directly or via the storing section 100.

The obtaining section 110 can obtain an input data including candidate data. The candidate data can represent a plurality of candidates, which can be regarded as the plurality of candidates of results of information processing (e.g, speech-to-text processing). In an embodiment, the candidate data can correspond to data of a text, and each of the plurality of candidates can correspond to a candidate for a character, a word, or a phrase in the text.

The obtaining section 110 can further obtain training data. The training data can include one or more of candidates' data and one or more of correct outputs for training. Each candidate's data can correspond to each correct output. The obtaining section can obtain the input data and/or the training data from an external device or storage media such as a database 20.

The calculating section 120 can calculate output data in a recurrent layer of the RNN. In an embodiment, the calculating section 120 can calculate one or more of next states in a recurrent layer of the RNN based on current states and the plurality of candidates. In an embodiment, the calculating section 120 can calculate, for each candidate, a temporal next state of the RNN by inputting a corresponding candidate to the RNN at a current state. The detail of the calculation of the calculating section 120 is explained below.

The merging section 130 can merge the temporal next state for each of the candidates to obtain a next state of the RNN. The merging section 130 can further update the current state of the RNN according to the obtained next state of the recurrent layer in the RNN. The merging section 130 can determine the last state of the recurrent layer in the RNN. The detail of the merging of the merging section 130 is explained below.

The outputting section 150 can output data from the RNN. In an embodiment, the outputting section 150 can obtain the last state of the recurrent layer from the merging section 130, and further calculate the output data by processing an output layer of the RNN based on the last state, which is based on at least the next state processed by the calculating section 120. In other embodiments, the outputting section 150 can output the last states of the recurrent layer obtained from the merging section 130 as the output data of the RNN.

The training section 160 can train the RNN based on the training data. In an embodiment, the training section 160 can train the RNN such that an error between the candidate data and the correct output is reduced. The training section 160 can utilize results of processing of the calculating section 120, the merging section 130, and the outputting section 150 for the training.

Figure 2:
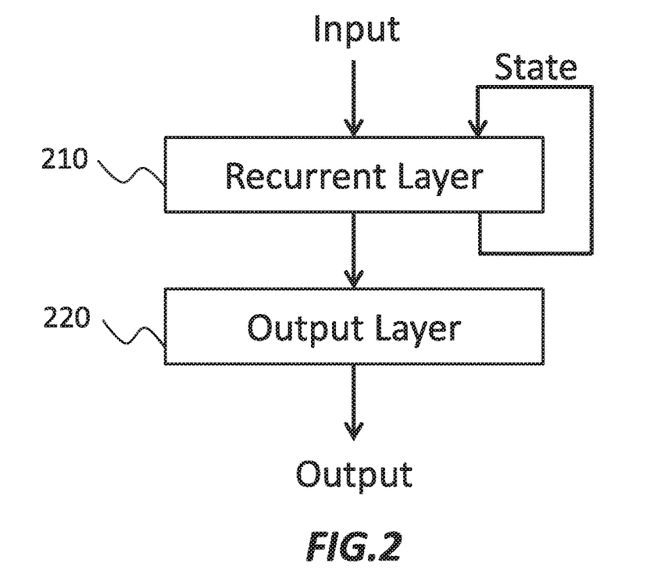
FIG. 2 shows a Recurrent Neural Network (RNN), according to an embodiment of the present invention.

FIG. 2 shows a RNN according to an embodiment of the present invention. In an embodiment, the RNN includes a recurrent layer 210 and an output layer 220. As shown in FIG. 2, the recurrent layer 210 can iteratively receive a new input and calculate a next state based on a new input and a current state for each time point. The recurrent layer 210 can update a state for each time point.

The recurrent layer 210 can provide the output layer 220 with an output of the recurrent layer 210 (e.g., the last state) for the candidate data. The recurrent layer 210 according to the embodiment can be implemented by a calculating section such as the calculating section 120 and a merging section such as the merging section 130.

The output layer 220 can process a resultant output data based on the output from the recurrent layer 210. The output layer 220 can be a softmax layer or hierarchical softmax layer. The output layer 220 can be implemented by an outputting section such as the outputting section 150.

Figure 3:
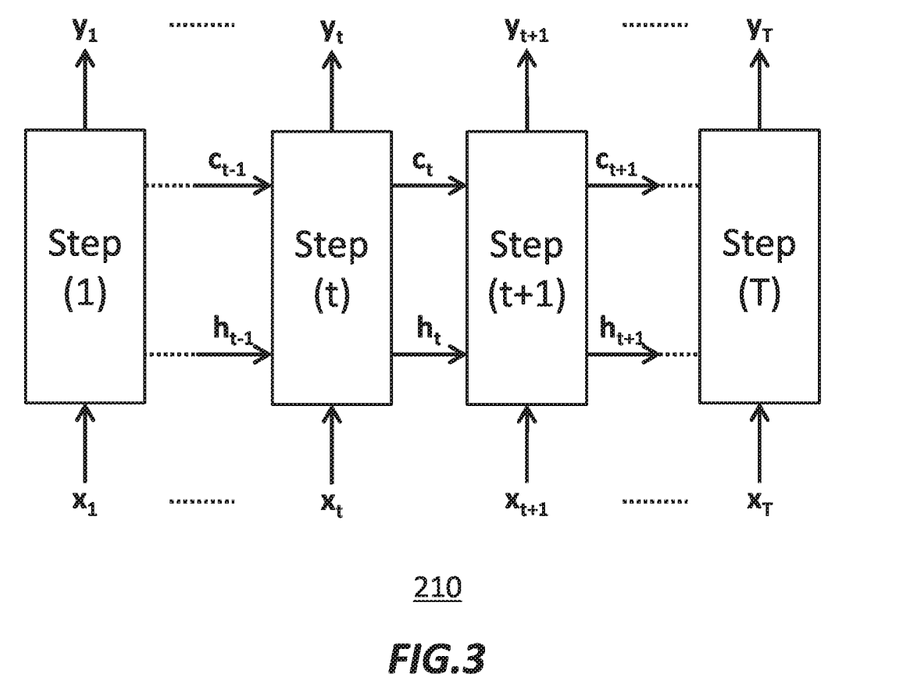
FIG. 3 shows a Long Short-Term Memory (LSTM), according to an embodiment of the present invention.

FIG. 3 shows a Long Short-Term Memory (LSTM) according to an embodiment of the present invention. In an embodiment, the RNN can include a LSTM. For example, a recurrent layer in the RNN such as the recurrent layer 210 can be implemented by the LSTM represented in FIG. 3. In such embodiment, a state (referred to as "the current state" and "the next state" above) includes a hidden state $h_t$ and a cell state $c_t$ for a time point t, where t=1, ..., T.

In an embodiment as shown in FIG. 3, the LSTM can input ($c_0$, $h_0$, $x_1$), calculate ($c_1$, $h_1$), and output $y_1$ at a time point 1, ..., input ($c_{t-1}$, $h_{t-1}$, $x_t$) and calculate ($c_t$, $h_t$) at a time point t, input ($c_t$, $h_t$, $x_{t+1}$) and calculate ($c_{t+1}$, $h_{t+1}$) at a time point t+1, ..., input ($c_{T-1}$, $h_{T-1}$, $x_T$) and calculate ($c_T$, $h_T$) at a time point T. The LSTM can output $y_t$ for time point t, which may be the same as the hidden state $h_t$. The LSTM can output $y_T$ at the last time point T as the last state of the recurrent layer.

Figure 4:
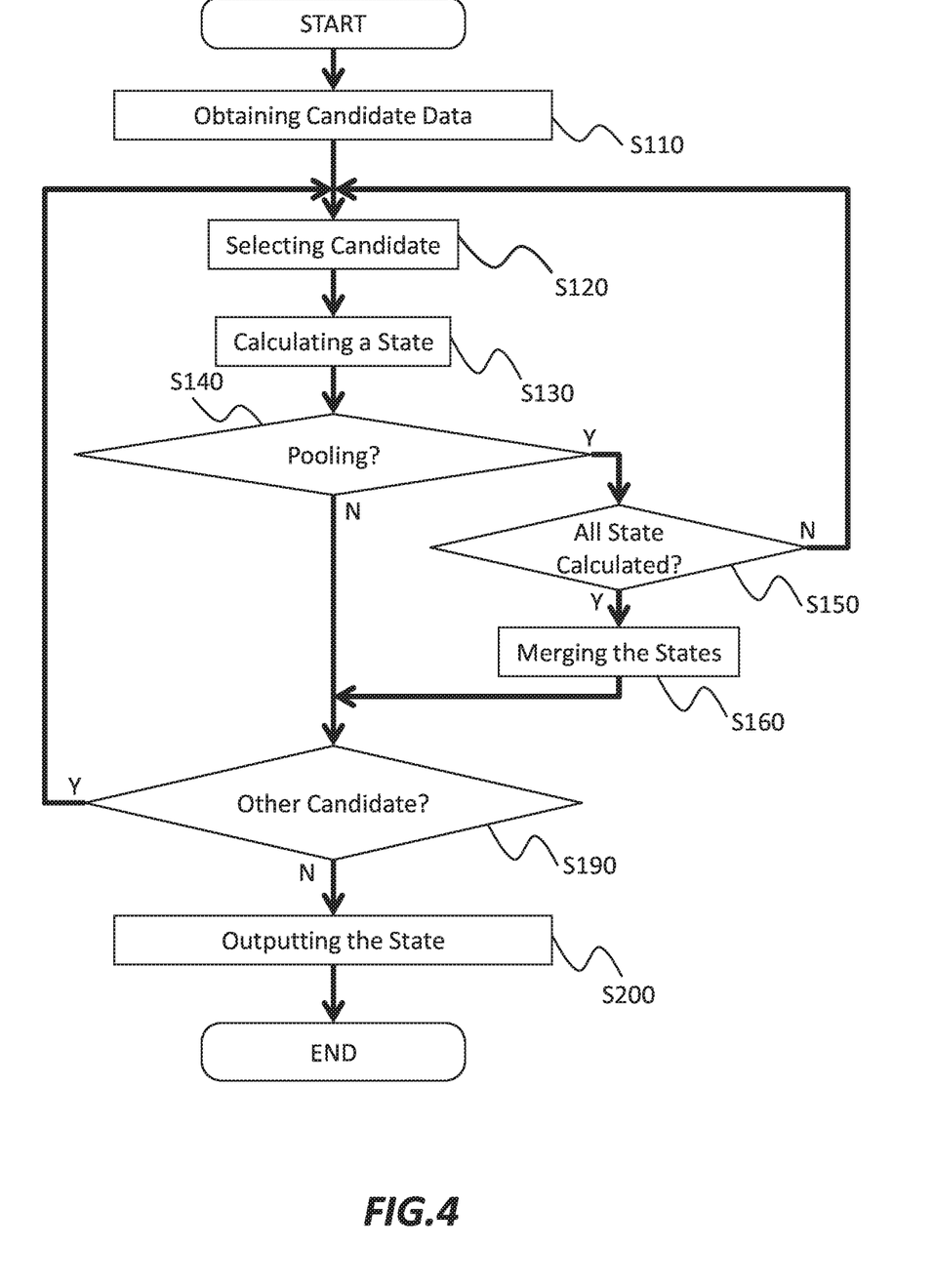
FIG. 4 shows a first operational flow, according to an embodiment of the present invention.

FIG. 4 shows a first operational flow according to an embodiment of the present invention. The present embodiment describes an example in which an apparatus, such as the apparatus 10, performs the operations from S110 to S200, as shown in FIG. 4. The apparatus can perform processing of the recurrent layer 210 of the RNN by performing the operation of S110-S200.

In some embodiments, the RNN can input text data including a plurality of candidates and stochastic information of the candidates and output an answer of a slot filling problem, an answer of key word spotting, and/or a translated text.

At S110, an obtaining section such as the obtaining section 110 can obtain a candidate data including a plurality of candidates, from a database such as the database 20. The obtaining section can obtain multiple hypotheses of data as the candidate data. In an embodiment, the obtaining section can obtain data having a confusion network structure as the candidate data. In an embodiment, each link in the confusion network can correspond to one candidate among a plurality of candidates.

In an embodiment, the obtaining section can obtain data represented by a word lattice as the candidate data. In an embodiment, each link between nodes in the word lattice corresponds to one candidate among a plurality of candidates.

In an embodiment, the obtaining section can obtain data having a directed graph structure as the candidate data. In an embodiment, each edge in the directed graph corresponds to one candidate among a plurality of candidates.

Figure 5:
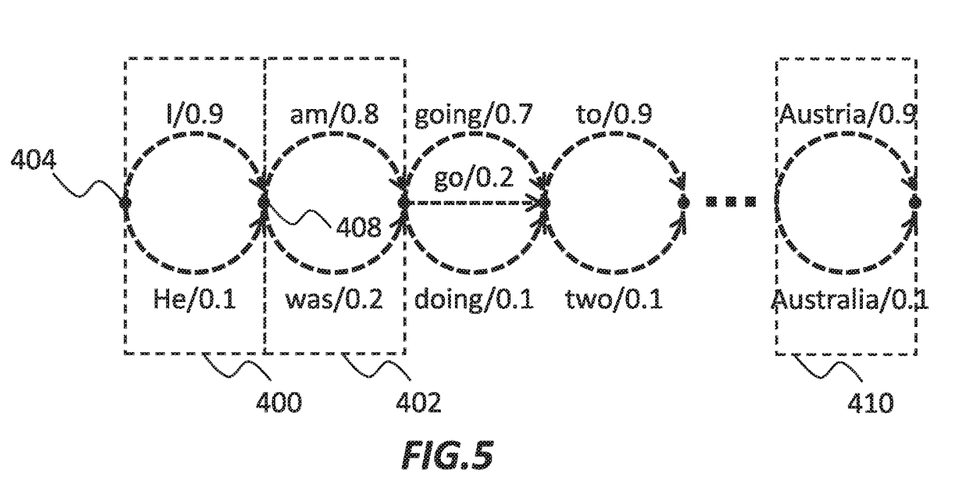
FIG. 5 shows a plurality of candidates of candidate data, according to an embodiment of the present invention.

FIG. 5 shows a plurality of candidates of candidate data according to an embodiment of the present invention. In an embodiment as shown in FIG. 5, the candidate data is represented by a confusion network for representing text. The candidate data can include a plurality of candidates and/or groups of candidates.

In an embodiment, the obtaining section can obtain a plurality of candidates and a plurality of occurrence probabilities. Each of the occurrence probabilities can indicate a probability of occurrence corresponding to each one of the candidates represented by the candidate data. In an embodiment as shown in FIG. 5, the candidate group 400 includes a candidate "I" and a candidate "He" and their occurrence probabilities. In an embodiment, an occurrence probability of "I" is 0.9 and an occurrence probability of "He" is 0.1. A candidate group can include one or three or more candidates. The candidate group 402 includes a candidate "am" and a candidate "was" and their occurrence probabilities. In an embodiment, an occurrence probability of "am" is 0.8 and an occurrence probability of "was" is 0.2. The candidate group can include one or three or more candidates.

As shown in FIG. 5, the candidate group can have candidates of a portion of a text. The candidate data of FIG. 5 indicates that the first word in the text is "I" or "He", the second word in the text is "am" or "was", the third word in the text is "going", "go", or "doing", a fourth word in the text is "to" or "two", . . . , the last word in the text is "Austria" or "Australia."

Figure 6:
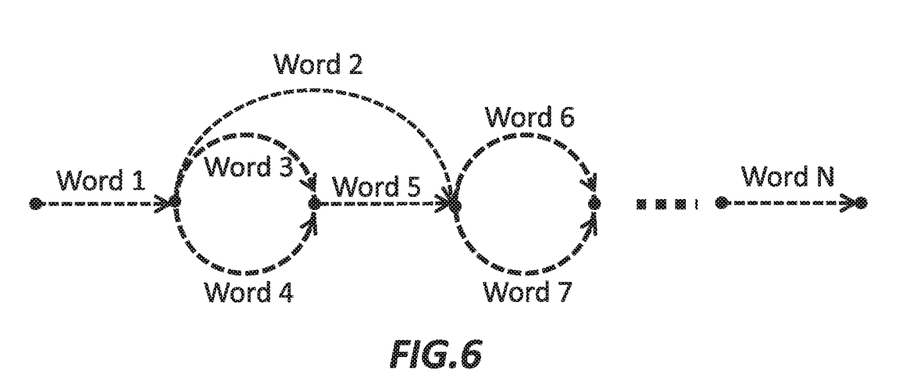
FIG. 6 shows a plurality of candidates of candidate data, according to another embodiment of the present invention.

FIG. 6 shows a plurality of candidates of candidate data according to an embodiment of the present invention. In an embodiment as shown in FIG. 6, the candidate data is represented by a word lattice for representing a text. In an embodiment as shown in FIG. 6, the candidate data indicates that the first portion in the text is Word 1, the second portion in the text may be (Word 2) or ((Word 3 or Word 4) and Word 5), the third portion in the text is Word 6 or Word 7, . . . , the last portion in the text is Word N.

The obtaining section can obtain speech-to-text data generated by speech recognition as the plurality of candidates. In an embodiment, the obtaining section can perform as the speech recognition system.

In some embodiments, the plurality of candidate data is not limited to a text. For example, the plurality of candidate data may be other data (e.g., music notes) having a structure of confusion network, lattice, or graph.

Next, at S120, the obtaining section can select one candidate from the plurality of candidates obtained at S110. The obtaining section can select a candidate that has not been selected and that is connected to another candidate of which state has already been calculated, among the plurality of candidates.

In an embodiment as shown in FIG. 5, the obtaining section can select a candidate in a group so as to select all candidates in the candidate group before selecting a candidate in another group. For example, the obtaining section can first select a candidate corresponding to "I" at the first S110, may select a candidate corresponding to "He" at the second S110, select a candidate corresponding to "am" at the third S110, select a candidate corresponding to "was" at the fourth S110, select a candidate corresponding to "going" at the fifth S110, select a candidate corresponding to "go" at the sixth S110, and select a candidate corresponding to "doing" at the seventh S110.

In an embodiment as shown in FIG. 6, for example, the obtaining section can first select a candidate corresponding to "Word 1" at the first S110, can select a candidate corresponding to "Word 2" at the second S110, select a candidate corresponding to "Word 3" at the third S110, select a candidate corresponding to "Word 4" at the fourth S110, select a candidate corresponding to "Word 5" at the fifth S110, select a candidate corresponding to "Word 6" at the sixth S110, and select a candidate corresponding to "Word 7" at the seventh S110. The obtaining section can provide a calculating section such as the calculating section 120 with information of the selected candidates.

Next, at S130, the calculating section can calculate a temporal next state of a recurrent layer in the RNN, by inputting candidate selected at S120 and a current state before inputting the candidate to the RNN. In an embodiment, the calculating section can calculate the temporal next state of a recurrent layer in LSTM. In an embodiment, the calculating section can adopt at least one of a variety of types of LSTM (e.g., LSTM described in Gers & Schmidhuber (2000), Cho, et al. (2014), Koutnik, et al. (2014), Yao et al. (2015), Greff, et al. (2015), or Jozefowicz, et al. (2015). In some embodiments, the calculating section can adopt GRU instead of LSTM, as described by Junyoung Chung, Caglar Gulcehre, KyungHyun Cho, Yoshua Bengio, Empirical Evaluation of Gated Recurrent Neural Networks on Sequence Modeling which can be obtained at "arxiv.org/abs/1412.3555".

In an embodiment as shown in FIG. 5, the calculating section can calculate a temporal next state for a candidate "I" in the candidate group 400 based on a state at a node 404 and the candidate "I" at S130. The calculating section can provide the calculated state to a merging section such as the merging section 130 directly or via a storing section such as the storing section 100. The calculating section can provide the merging section with the temporal next state.

Next at S140, the merging section can determine whether to perform pooling operation for two or more candidates. In an embodiment, the merging section can determine whether the candidate, of which the temporal next state is calculated at the latest S130, may or may not merge with another candidate. In an embodiment as shown in FIG. 5, the merging section can determine that the candidate "I" merges with another candidate (e.g., the candidate "He") at S140 after performing operation of S130 for the candidate "I."

If the decision is positive, the merging section can proceed with an operation of S150. If the decision is negative, the merging section can proceed with an operation of S190.

At S150, the merging section can determine whether temporal next states of all candidates to be merged are calculated at previous operations of S130. In an embodiment as shown in FIG. 5, the merging section can determine that the temporal next state for the candidate "I" and the temporal next state for the candidate "He" at S140 are calculated after performing operations of S130 for the candidate "He" and the candidate "I."

If the decision is positive, the merging section can proceed with an operation of S160. If the decision is negative, the merging section can go back to the operation of S120 to select a new candidate.

At S160, the merging section can merge the temporal next states of two or more candidates. The merging section can perform a pooling operation (e.g., mean pooling or max pooling) of the two or more candidates.

In an embodiment, the merging section can calculate a mean value of the temporal next states of the two or more of candidates to be merged, and obtain the mean value as the next state. In an embodiment, the merging section can calculate a weighted or non-weighted mean value of the temporal next states. In an embodiment, the merging section can calculate the mean value such that each temporal next state is weighted by the occurrence probability of the corresponding candidate. In an embodiment as shown in FIG. 5, the merging section can calculate a next state at a node 408 by multiplying the temporal next state corresponding to the candidate "I" by 0.9, multiplying the temporal next state corresponding to the candidate "He" by 0.1, and adding the multiplied results to obtain the merged state.

In another embodiment, the merging section can adopt one of the temporal next states of the plurality of candidates with the occurrence probability of each candidate. In an embodiment, the merging section can adopt the temporal next state of the candidate "I" with a probability of 90% and adopt the temporal next state of the candidate "He" with a probability of 10% as the next state.

The merging section can set the next state as a current state for one or more following candidates. In an embodiment as shown in FIG. 5, the merging section can set the next state calculated from the temporal next state of the candidate "I" and the temporal next state of the candidate "He" as a current state for the candidate "am" and a current state for the candidate "was."

In an embodiment as shown in FIG. 6, the merging section can set the next state calculated from the temporal next state of the candidate "Word 3" and the temporal next state of the candidate "Word 4" as a current state for the candidate "Word 5." In an embodiment, the merging section can set the next state calculated from the temporal next state of the candidate "Word 2" and the temporal next state of the candidate "Word 5" as a current state for the candidate "Word 6" and a current state for the candidate "Word 7."

The merging section can store the updated current state in the storing section. After the operation of S160, the merging section can proceed with an operation of S190.

At S190, the obtaining section can determine whether there is a candidate that has not been selected at S120. If the decision is positive, then the obtaining section can perform again the operation of S120 to select a new candidate. If the decision is negative, the obtaining section can proceed with an operation of S200.

At S200, an outputting section such as the outputting section 150 can output an output data of the recurrent layer 210 in the RNN. In an embodiment, the outputting section can obtain the last state of the recurrent layer from the merging section. For example, if the candidate finally selected at S120 is processed by merging operation at S160, then the merging section can provide the outputting section with the merged state (calculated as the next state) as the output data of the recurrent layer. If the candidate finally selected at S120 is not processed by merging operation at S160 and passes through a S140-S190 route, then the merging section can provide the outputting section with the temporal next state calculated for the finally selected candidate at S130 as the output data of the recurrent layer.

For example, in an embodiment as shown in FIG. 5, the outputting section can output a merged state obtained from a temporal next state of the candidate "Austria" and a temporal next state of the candidate "Australia" as the output data of the recurrent layer of the RNN. In an embodiment as shown in FIG. 6, the outputting section can output a temporal next state of the candidate "Word N" as the output data of the recurrent layer 210 of the RNN.

In other embodiments, the outputting section can output calculated states calculated at S130 or the merged state calculated at S160 for a plurality of candidates as the output data of the recurrent layer. For example, in an embodiment as shown in FIG. 5, the outputting section can output not only the merged state obtained from the block 410 but also the merged state obtained for block 400, the merged state obtained for the block 402 etc. as the output data of the recurrent layer.

After or during the operation of S200, the outputting section can further calculate output data of the output layer of the RNN based on the output data of the recurrent layer of the RNN.

Figure 7:
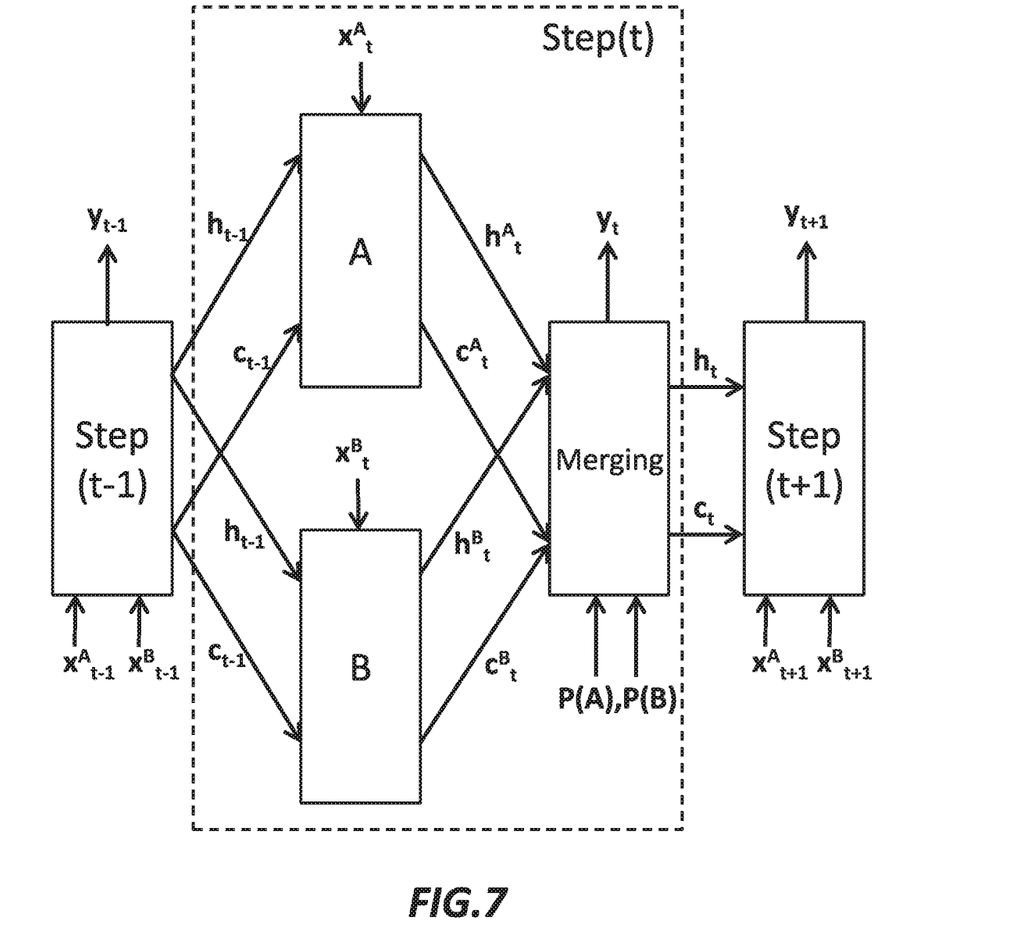
FIG. 7 shows a processing of each step in the LSTM, according to an embodiment of the present invention.

FIG. 7 shows processing of each step in the LSTM according to an embodiment of the present invention. In an embodiment, the apparatus can process the plurality of candidates represented by a confusion network such as shown in FIG. 5. In an embodiment, the apparatus can process a plurality of steps as the recurrent layers of the LSTM. In an embodiment, the apparatus can process a step 1, a step 2, . . . , a step (t−1), a step (t), a step (t+1), . . . , a step (N). Each step may correspond to each group in a plurality of candidates. For example, the step (t) may correspond to the candidate group 402, and blocks A and B may correspond to a candidate "am" and a candidate "was" in FIG. 5.

As shown in FIG. 7, at step (t), the calculating section can calculate a temporal next state for a block A and a temporal next state for a block B. In an embodiment, the calculate section can input a current state (e.g., a hidden state and a cell state shown as $h_{t-1}$ and $c_{t-1}$) and a candidate (shown as $x^A_t$), and calculate a temporal next state (shown as $h^A_t$ and $c^A_t$) for the candidate $x^A_t$ at an operation of S130 for the block A. The calculating section can also input a current state (shown as $h_{t-1}$ and $c_{t-1}$) and another candidate (shown as $x^B_t$), and calculate a temporal next state (shown as $h^B_t$ and $c^B_t$) for the candidate $x^B_t$ at another operation of S130 for the block B.

The merging section can input the temporal next states ($h^A_t$, $h^B_t$, $c^A_t$, $c^B_t$) for the two candidates ($x^A_t$, $x^B_t$) and probabilities of occurrence (shown as P(A) and P(B)) corresponding to the two candidates ($x^A_t$, $x^B_t$) for the blocks A and B. In an embodiment, the merging section can calculate the merged state $h_t$, based on $h^A_t$, $h^B_t$, P(A) and P(B). For example, the merging section can calculate $h^A_t \times P(A) + h^B_t \times P(B)$ to obtain $h_t$.

In an embodiment, the merging section can calculate the merged state $c_t$, based on $c^A_t$, $c^B_t$, P(A) and P(B). For example, the merging section can calculate $c^A_t \times P(A) + c^B_t \times P(B)$ to obtain $c_t$. The merging section can provide the next step (Step (t+1)) with the merged state ($h_t$, $c_t$). The apparatus can perform the step (t+1) in the same manner as the step (t).

Figure 8:
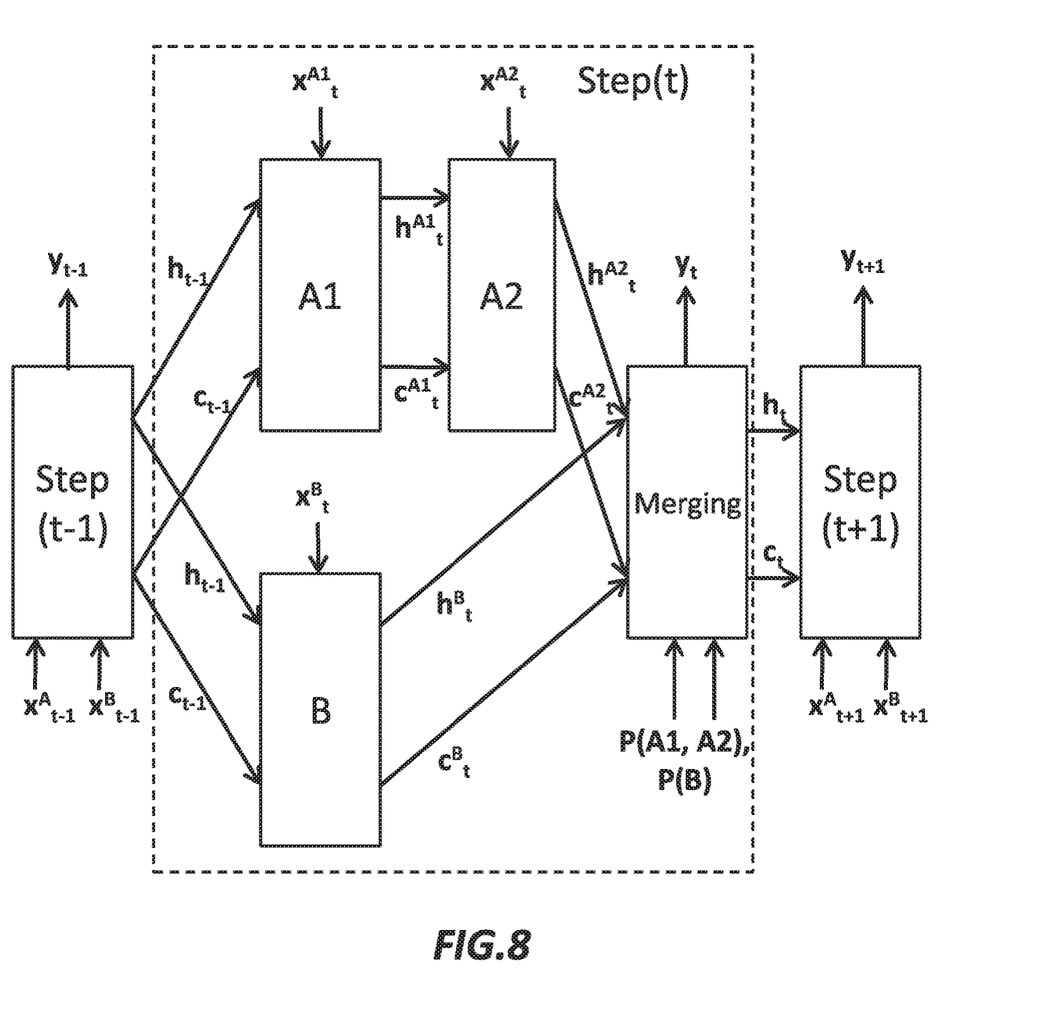
FIG. 8 shows a processing of each step in the LSTM, according to another embodiment of the present invention.

FIG. 8 shows a processing of each step in the LSTM according to another embodiment of the present invention. In an embodiment as shown in FIG. 8, the apparatus processes block A1 and block A2 at Step (t) instead of the block A of FIG. 7. Specifically, the calculating section can calculate a temporal next state ($h^{A1}t$, $c^{A1}t$) for block A1 by inputting a current state ($h_{t-1}$ and $c_{t-1}$) and a candidate $x^{A1}_t$, and then calculate a temporal next state ($h^{A2}_t$, $c^{A2}_t$) for block A2 by inputting a current state ($h^{A1}_t$ and $c^{A1}_t$) and a candidate $x^{A2}_t$. The calculating section can calculate a temporal next state ($h^Bt$, $c^Bt$) for block B in the same manner in relation to FIG. 7.

The merging section can input the temporal next states ($h^{A2}_t$, $h^B_t$, $c^{A2}_t$, $c^B_t$) and probabilities of occurrence (shown as P(A1, A2) and P(B)). The merging section can calculate the merged state $h_t$, based on $h^{A2}_t$, $h^B_t$, P(A1, A2) and P(B). The merging section can calculate the merged state $c_t$, based on $c^{A2}_t$, $c^B_t$, P(A1, A2) and P(B). The merging section can provide the next step (Step (t+1)) with the merged state ($h_t$, $c_t$). The apparatus can perform the step (t+1) in the same manner as the step (t).

In an embodiment as shown in FIG. 8, the calculating section can serially calculate states for candidate between branching and merging (e.g., (A1 and A2)) and then the merging section can perform merging.

As explained above, the apparatus according to the embodiments can perform calculation of the RNN based on a plurality of candidates instead of a single datum (e.g., a text). Thereby the apparatus can obtain output data from the RNN for multiple hypothetical data with varying confidence such as those represented by confusion network, lattice, or graph structure.

Figure 9:
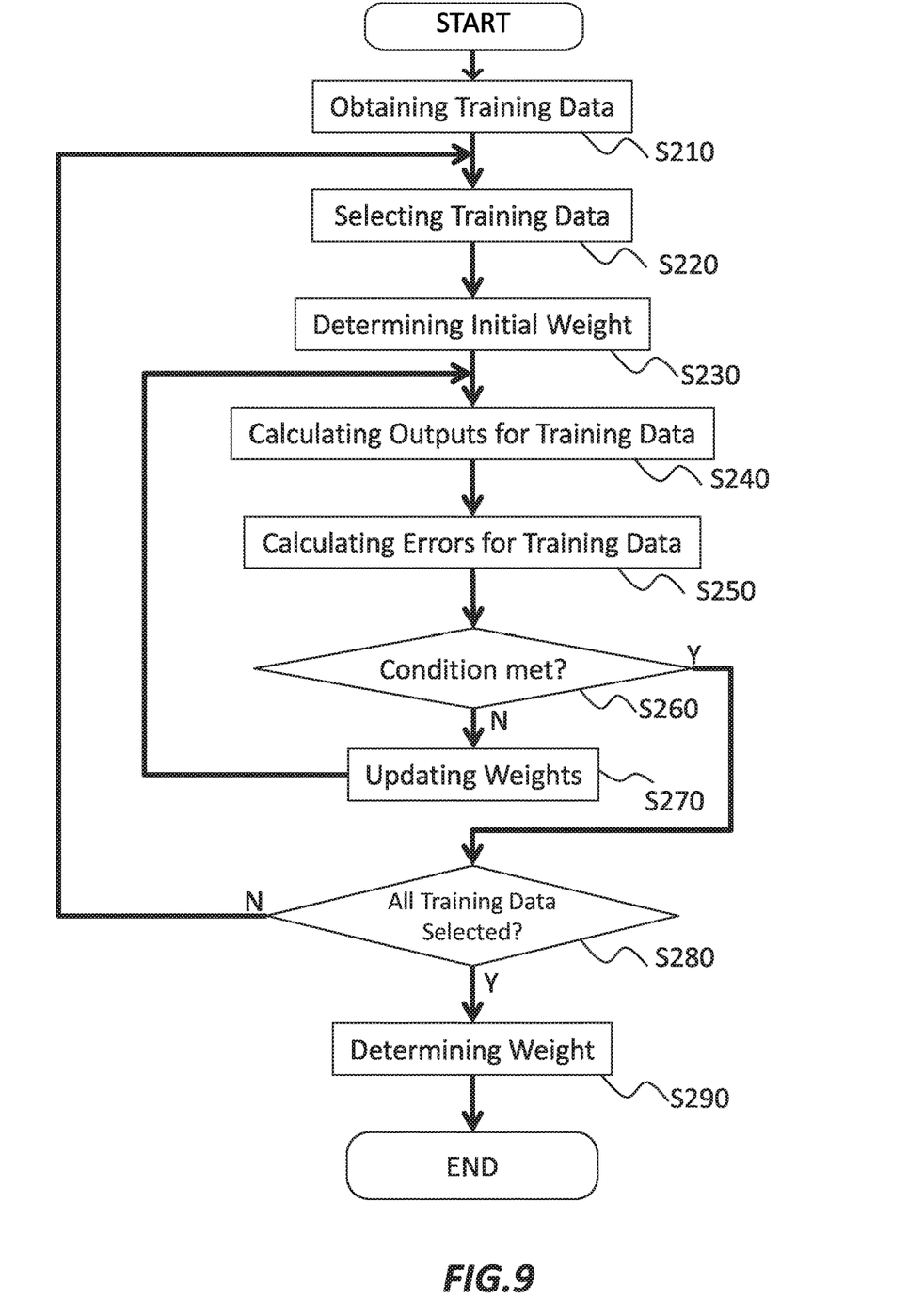
FIG. 9 shows a second operational flow, according to an embodiment of the present invention.

FIG. 9 shows a second operational flow according to an embodiment of the present invention. The present embodiment describes an example in which an apparatus, such as apparatus 10, performs the operations from S210 to S290, as shown in FIG. 9. The apparatus can perform training of the RNN by performing the operation of S210-S290.

At S210, the obtaining section can obtain a plurality of training data. In an embodiment, each training data in the plurality of training data can include a candidate data and a correct output. In an embodiment explained in relation to FIG. 9, the training data includes 10,000 confusion networks representing 10,000 speech-to-text data and 10,000 correct outputs as 10,000 training data. Each confusion network in each training data includes a candidate data. In an embodiment, each correct output can be a 5-digit ID and the RNN is trained to identify 5-digit ID in speech-to-text data.

Next at S220, the obtaining section may select the predetermined number of training data from the plurality of training data obtained at S210. In an embodiment, the obtaining section can select not yet selected 100 training data from 10,000 training data. In an embodiment, the obtaining section can randomly select 100 training data from 10,000 training data.

Next at S230, the training section can determine initial weights for an RNN. In an embodiment, the training section can randomly initialize weights for the RNN at the first operation of S230. On and after the second operations of S230, the training section can determine the weights updated at the last S270 as the initial weights.

Next at S240, the training section can cause the calculating section to calculate output of the RNN for candidate data of the training data selected at S220. In an embodiment, the training section can first cause the calculating section to perform calculation of the recurrent layer according to the operational flow of FIG. 4 to obtain the last state of the recurrent layer for each training data.

Then the training section can cause the outputting section to perform calculation of an output layer such as the output layer 220 based on the last state of the recurrent layer for each training data. In an embodiment, the output layer can include one or more softmax layers. The training section can obtain a result of the calculation as an output data of the output layer in the RNN for each training data. In an embodiment, the training section can obtain 100 output data from the 100 training data selected at S220.

Next at S250, the training section can calculate errors for the predetermined number of training data selected at S220. In an embodiment, the training section can calculate an error between the correct output of each training data and the output data of the RNN from each training data calculated at S240. In an embodiment, the training section can calculate 100 errors from the 100 training data.

Next at S260, the training section may determine whether a condition is met or not. In an embodiment, the training section may determine whether the errors calculated at S250 is below a threshold or not. In an embodiment, the training section may determine whether a sum of errors calculated for the predetermined number of training data (e.g., 100 training data) is below the threshold or not. If the error is below the threshold, the training section can proceed with an operation of S280. If the error is not below the threshold, the training section can proceed with an operation of S270.

Next at S270, the training section can update the weights of the RNN based on the errors calculated at S250. In an embodiment, the training section can update the weights so as to minimize a total amount of errors in the output layer and the recurrent layer of the RNN for each training data. In an embodiment, the training section can calculate differential values of weights of the RNN for each training data by performing Back Propagation Through Time (BPTT) and then update the weights of the RNN by using the differential values based on Stochastic Gradient Descent (SGD) for each training data.

The training section can calculate the differential value by propagating the error through the output layer and the recurrent layer. The training section can propagate the error on paths used in the calculation of the output data of the recurrent layer during backpropagation of the recurrent layer. In an embodiment as shown in FIG. 7, the training section may propagate the error both on a path including block A and a path including block B. And the training section may merge the errors from the two paths in the same manner as the merging of temporal next states (e.g., calculating a mean value of the errors based on ratio of P(A):P(B).)

In other embodiments, the training section can propagate the error on one of paths. For example, the training section can propagate the error on a path including the block having the largest probability of occurrence (e.g., a path including the block A if $x^A_t > x^B_t$).

The training section can update the weights of the RNNs for a predetermined number of training data (e.g., the 100 training data) at once. In other words, the weights of a single RNN are updated based on a predetermined number of training data.

At S280, the training section may determine whether all the training data obtained at S210 has been selected at S220 or not. In an embodiment, the training section may determine whether the training section has selected all 10,000 training data at a plurality of operations of S220. If the all training data has been selected, the training section may proceed with an operation of S290, or, the training section can go back to the operation of S220 to select new training data. In other embodiments, the training section can determine whether the predetermined number of operations of S220 have been performed or not.

At S290, the training section can determine the weights of the RNN. In an embodiment, the training section can determine the weights updated at the last S270 as the weights of the RNN.

In the description of FIG. 9, the training section can perform mini-batch in which the weights are updated at once based on differential values obtained from a portion of a plurality of training data. In other embodiments, the training section can full batch or online learning for updating the weights.

Figure 10:
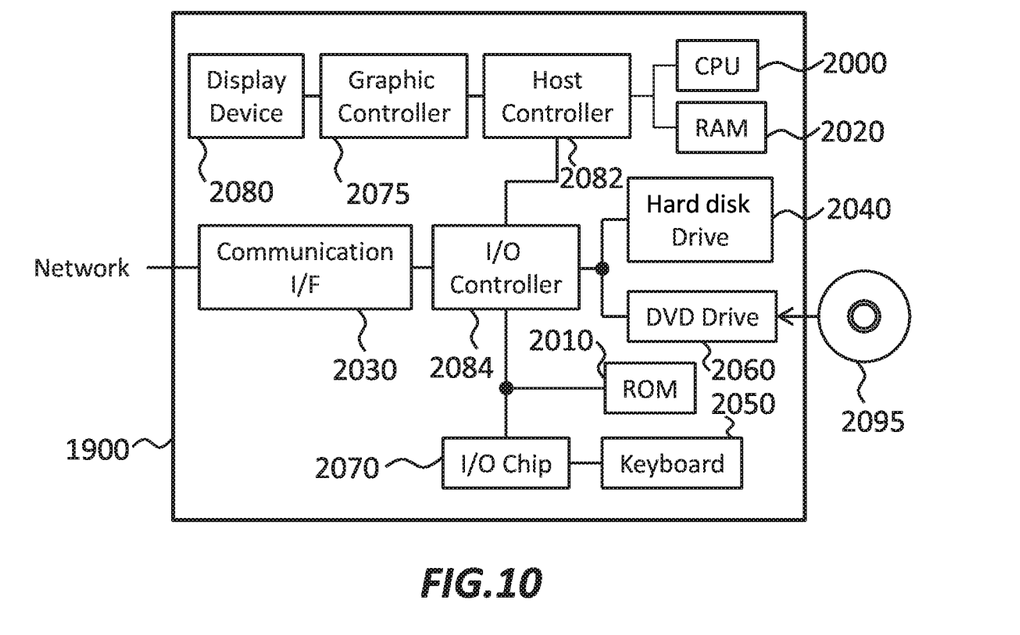
FIG. 10 shows an exemplary hardware configuration of a computer 1900 that functions as a system, according to an embodiment of the present invention.

FIG. 10 shows an exemplary configuration of a computer 1900 according to an embodiment of the invention. The computer 1900 according to the present embodiment includes a CPU 2000, a RAM 2020, a graphics controller 2075, and a display device 2080 which are mutually connected by a host controller 2082. The computer 1900 also includes input/output units such as a communication interface 2030, a hard disk drive 2040, and a DVD-ROM drive 2060 which are connected to the host controller 2082 via an input/output controller 2084. The computer also includes legacy input/output units such as a ROM 2010 and a keyboard 2050 which are connected to the input/output controller 2084 through an input/output chip 2070.

The host controller 2082 connects the RAM 2020 with the CPU 2000 and the graphics controller 2075 which access the RAM 2020 at a high transfer rate. The CPU 2000 operates according to programs stored in the ROM 2010 and the RAM 2020, thereby controlling each unit. The graphics controller 2075 obtains image data generated by the CPU 2000 on a frame buffer or the like provided in the RAM 2020, and causes the image data to be displayed on the display apparatus 2080. Alternatively, the graphics controller 2075 may contain therein a frame buffer or the like for storing image data generated by the CPU 2000.

The input/output controller 2084 connects the host controller 2082 with the communication interface 2030, the hard disk drive 2040, and the DVD-ROM drive 2060, which are relatively high-speed input/output units. The communication interface 2030 communicates with other electronic devices via a network. The hard disk drive 2040 stores programs and data used by the CPU 2000 within the computer 1900. The DVD-ROM drive 2060 reads the programs or the data from the DVD-ROM 2095, and provides the hard disk drive 2040 with the programs or the data via the RAM 2020.

The ROM 2010 and the keyboard 2050 and the input/output chip 2070, which are relatively low-speed input/output units, are connected to the input/output controller 2084. The ROM 2010 stores therein a boot program or the like executed by the computer 1900 at the time of activation, a program depending on the hardware of the computer 1900. The keyboard 2050 inputs text data or commands from a user, and can provide the hard disk drive 2040 with the text data or the commands via the RAM 2020. The input/output chip 2070 connects a keyboard 2050 to an input/output controller 2084, and can connect various input/output units via a parallel port, a serial port, a keyboard port, a mouse port, and the like to the input/output controller 2084.

A program to be stored on the hard disk drive 2040 via the RAM 2020 is provided by a recording medium as the DVD-ROM 2095, and an IC card. The program is read from the recording medium, installed into the hard disk drive 2040 within the computer 1900 via the RAM 2020, and executed in the CPU 2000.

A program that is installed in the computer 1900 and causes the computer 1900 to function as an apparatus, such as apparatus 10 of FIG. 1. The program or module acts on the CPU 2000, to cause the computer 1900 to function as a storing section, an obtaining section, a calculating section, a merging section, an outputting section, a training section, such as the storing section 100, the obtaining section 110, the calculating section 120, the merging section 130, the outputting section 150, the training section 160 described above.

The information processing described in these programs is read into the computer 1900, to function as the storing section, the obtaining section, the calculating section, the merging section, the outputting section, the training section, which are the result of cooperation between the program or modules and the above-mentioned various types of hardware resources. Moreover, the apparatus is constituted by realizing the operation or processing of information in accordance with the usage of the computer 1900.

For example when communication is performed between the computer 1900 and an external device, the CPU 2000 can execute a communication program loaded onto the RAM 2020, to instruct communication processing to a communication interface 2030, based on the processing described in the communication program. The communication interface 2030, under control of the CPU 2000, reads the transmission data stored on the transmission buffering region provided in the recording medium, such as a RAM 2020, a hard disk drive 2040, or a DVD-ROM 2095, and transmits the read transmission data to a network, or writes reception data received from a network to a reception buffering region or the like provided on the recording medium. In this way, the communication interface 2030 can exchange transmission/reception data with the recording medium by a DMA (direct memory access) method, or by a configuration that the CPU 2000 reads the data from the recording medium or the communication interface 2030 of a transfer destination, to write the data into the communication interface 2030 or the recording medium of the transfer destination, so as to transfer the transmission/reception data.

In addition, the CPU 2000 may cause all or a necessary portion of the files of the database to be read into the RAM 2020 such as by DMA transfer, the files or the database having been stored in an external recording medium such as the hard disk drive 2040, the DVD-ROM drive 2060 (DVD-ROM 2095) to perform various types of processing onto the data on the RAM 2020. The CPU 2000 can then write back the processed data to the external recording medium by means of a DMA transfer method or the like. In such processing, the RAM 2020 can be considered to temporarily store the contents of the external recording medium, and so the RAM 2020, the external recording apparatus, and the like are collectively referred to as a memory, a storage section, a recording medium, a computer readable medium, etc. Various types of information, such as various types of programs, data, tables, and databases, can be stored in the recording apparatus, to undergo information processing. Note that the CPU 2000 can also use a part of the RAM 2020 to perform reading/writing thereto on the cache memory. In such an embodiment, the cache is considered to be contained in the RAM 2020, the memory, and/or the recording medium unless noted otherwise, since the cache memory performs part of the function of the RAM 2020.

The CPU 2000 can perform various types of processing, onto the data read from the RAM 2020, which includes various types of operations, processing of information, condition judging, search/replace of information, etc., as described in the present embodiment and designated by an instruction sequence of programs, and writes the result back to the RAM 2020. For example, when performing condition judging, the CPU 2000 can judge whether each type of variable shown in the present embodiment is larger, smaller, no smaller than, no greater than, or equal to the other variable or constant, and when the condition judging results in the affirmative (or in the negative), the process branches to a different instruction sequence, or calls a sub routine.

In addition, the CPU 2000 can search for information in a file, a database, etc., in the recording medium. For example, when a plurality of entries, each having an attribute value of a first attribute is associated with an attribute value of a second attribute, are stored in a recording apparatus, the CPU 2000 can search for an entry matching the condition whose attribute value of the first attribute is designated, from among the plurality of entries stored in the recording medium, and reads the attribute value of the second attribute stored in the entry, thereby obtaining the attribute value of the second attribute associated with the first attribute satisfying the predetermined condition.

The above-explained program or module can be stored in an external recording medium. Exemplary recording mediums include a DVD-ROM 2095, as well as an optical recording medium such as a Blu-ray Disc® or a CD, a magneto-optic recording medium such as a MO, a tape medium, and a semiconductor memory such as an IC card. In addition, a recording medium such as a hard disk or a RAM provided in a server system connected to a dedicated communication network or the Internet can be used as a recording medium, thereby providing the program to the computer 1900 via the network.

Embodiments of the present invention can be a system, a method, and/or a computer program product. The computer program product can include a computer readable storage medium (or media) having computer readable program instructions thereon for causing a processor to carry out embodiments of the present invention.

The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can include copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of embodiments of the present invention can be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to individualize the electronic circuitry, in order to perform aspects of the present invention.

Embodiments of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein includes an article of manufacture including instructions which implement aspects of the function/act specified in the flowchart and/or block diagram block or blocks.

The computer readable program instructions can also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams can represent a module, segment, or portion of instructions, which includes one or more executable instructions for implementing the specified logical function(s). In some alternative implementations, the functions noted in the block can occur out of the order noted in the figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the embodiments of the present invention have been described, the technical scope of the invention is not limited to the above described embodiments. It is apparent to persons skilled in the art that various alterations and improvements can be added to the above-described embodiments. It is also apparent from the scope of the claims that the embodiments added with such alterations or improvements can be included in the technical scope of the invention.

The operations, procedures, steps, and stages of each process performed by an apparatus, system, program, and method shown in the claims, embodiments, or diagrams can be performed in any order as long as the order is not indicated by "prior to," "before," or the like and as long as the output from a previous process is not used in a later process. Even if the process flow is described using phrases such as "first" or "next" in the claims, embodiments, or diagrams, it does not necessarily mean that the process must be performed in this order.

What is claimed is:

1. A method, comprising:
obtaining, by a hardware processor, candidate data representing a plurality of candidates;
grouping, by the hardware processor, related candidates identified in the candidate data into respective groups of a confusion network;
calculating, by the hardware processor, for each of the candidates, a temporal next state of a Recurrent Neural Network (RNN) by inputting a corresponding one of the candidates to the RNN at a current state, the temporal next state of each related candidate in a group of the respective groups being calculated before calculating the temporal next state of the candidates in a next group of the respective groups, wherein, for at least one temporal state of the RNN, the candidates include multiple distinct paths, and at least one of the multiple distinct paths includes multiple candidates;
merging, by the hardware processor, the temporal next state of the related candidates of each group of the respective groups to obtain a plurality of merged temporal next states, each weighted by a probability of a corresponding candidate in the confusion network; and
representing multiple candidates with associated confidences, by the hardware processor, using the plurality of merged temporal next states.

2. The method of claim 1, further comprising updating the current state of the RNN according to the temporal next state of the RNN.

3. The method of claim 1, wherein the obtaining step includes obtaining a plurality of occurrence probabilities for each of the candidates, each of the occurrence probabilities indicating a probability of occurrence for each of the candidates represented by the candidate data, and
wherein the merging step includes calculating a mean value of temporal next states of the candidates, each of the temporal next states weighted by a respective one of the occurrence probabilities for each of the candidates.

4. The method of claim 1, wherein the RNN includes a Long Short-Term Memory (LSTM), and each of the current states and the next states includes a hidden state and a cell state.

5. The method of claim 1, wherein the candidate data has a directed graph structure, wherein each edge in the directed graph structure corresponds to one of the candidates from among the plurality of candidates.

6. The method of claim 1, wherein the candidate data has a confusion network structure, and wherein each link in the confusion network structure corresponds to one of the candidates from among the plurality of candidates.

7. The method of claim 6, wherein each of the candidates corresponds to a word or a phrase in a text.

8. The method of claim 7, wherein the obtaining candidate data further comprises generating, by speech recognition, speech-to-text data.

9. The method of claim 8, further comprising:
obtaining training data including a candidate data set corresponding to a correct output, wherein the candidate data set includes the candidate data representing the plurality of candidates; and
training the RNN based on the training data.

10. The method of claim 7, further comprising calculating output data by processing an output layer of the RNN based on at least the next state of the RNN, wherein the next state of the RNN corresponds to a recurrent layer of the RNN.

11. The method of claim 10, wherein the output data further comprises at least one selected from the group consisting of an answer of a slot filling problem, an answer of key word spotting, and translated text.

12. An apparatus comprising:
a processor, configured to:
obtain candidate data representing a plurality of candidates;
group related candidates identified in the candidate data into respective groups of a confusion network;
calculate, for each of the candidates, a temporal next state of a Recurrent Neural Network (RNN) by inputting a corresponding one of the candidates to the RNN at a current state, the temporal next state of each related candidate in a group of the respective groups being calculated before calculating the temporal next state of the candidates in a next group of the respective groups, wherein, for at least one temporal state of the RNN, the candidates include multiple distinct paths, and at least one of the multiple distinct paths includes multiple candidates;
merge the temporal next state of the related candidates of each group of the respective groups to obtain a plurality of merged temporal next states, each weighted by a probability of a corresponding candidate in the confusion network; and
represent multiple candidates with associated confidences using the plurality of merged temporal next states.

13. The apparatus of claim 12, wherein the processor is further configured to update the current state of the RNN according to the temporal next state of the RNN.

14. The apparatus of claim 12, wherein the processor obtains the candidate data by obtaining a plurality of occurrence probabilities, each of the occurrence probabilities indicating a probability of occurrence for each of the candidates represented by the candidate data, and
the processor merges the temporal next state by calculating a mean value of temporal next states of the candidates, each of the temporal next states weighted by a respective one of the occurrence probabilities for each of the candidates.

15. The apparatus of claim 12, wherein the RNN is a Long Short-Term Memory (LSTM), and each of the current states and the next states includes a hidden state and a cell state.

16. The apparatus of claim 12, wherein the candidate data has a directed graph structure, and wherein each edge in the directed graph structure corresponds to one of the candidates among the plurality of candidates.

17. A computer program product comprising a non-transitory computer readable storage medium having program instructions embodied therewith, the program instructions executable by a computer to cause the computer to perform a method, the method comprising:
obtaining, by a hardware processor, candidate data representing a plurality of candidates;
grouping, by the hardware processor, related candidates identified in the candidate data into respective groups of a confusion network;
calculating, by the hardware processor, for each of the candidates, a temporal next state of a Recurrent Neural Network (RNN) by inputting a corresponding one of the candidates to the RNN at a current state, the temporal next state of each related candidate in a group of the respective groups being calculated before calculating the temporal next state of the candidates in a next group of the respective groups, wherein, for at least one temporal state of the RNN, the candidates include multiple distinct paths, and at least one of the multiple distinct paths includes multiple candidates;
merging, by the hardware processor, the temporal next state of the related candidates of each group of the respective groups to obtain a plurality of merged temporal next states, each weighted by a probability of a corresponding candidate in the confusion network; and
representing multiple candidates with associated confidences, by the hardware processor, using the plurality of merged temporal next states.

18. The computer program product of claim 17, wherein the method further comprises updating the current state of the RNN according to the next state of the RNN.

19. The computer program product of claim 17, wherein the obtaining step includes obtaining a plurality of occurrence probabilities, wherein each occurrence probability indicates a probability of occurrence for each of the candidates represented by the candidate data, and
the merging step includes calculating a mean value of the temporal next states of the candidates, wherein each of the temporal next states is weighted by the occurrence probability for each of the candidates.

20. The computer program product of claim 17, wherein the RNN is a Long Short-Term Memory (LSTM), and each of the current states and the next states includes a hidden state and a cell state.

* * * * *